United States Patent Office 2,731,629
Patented Jan. 17, 1956

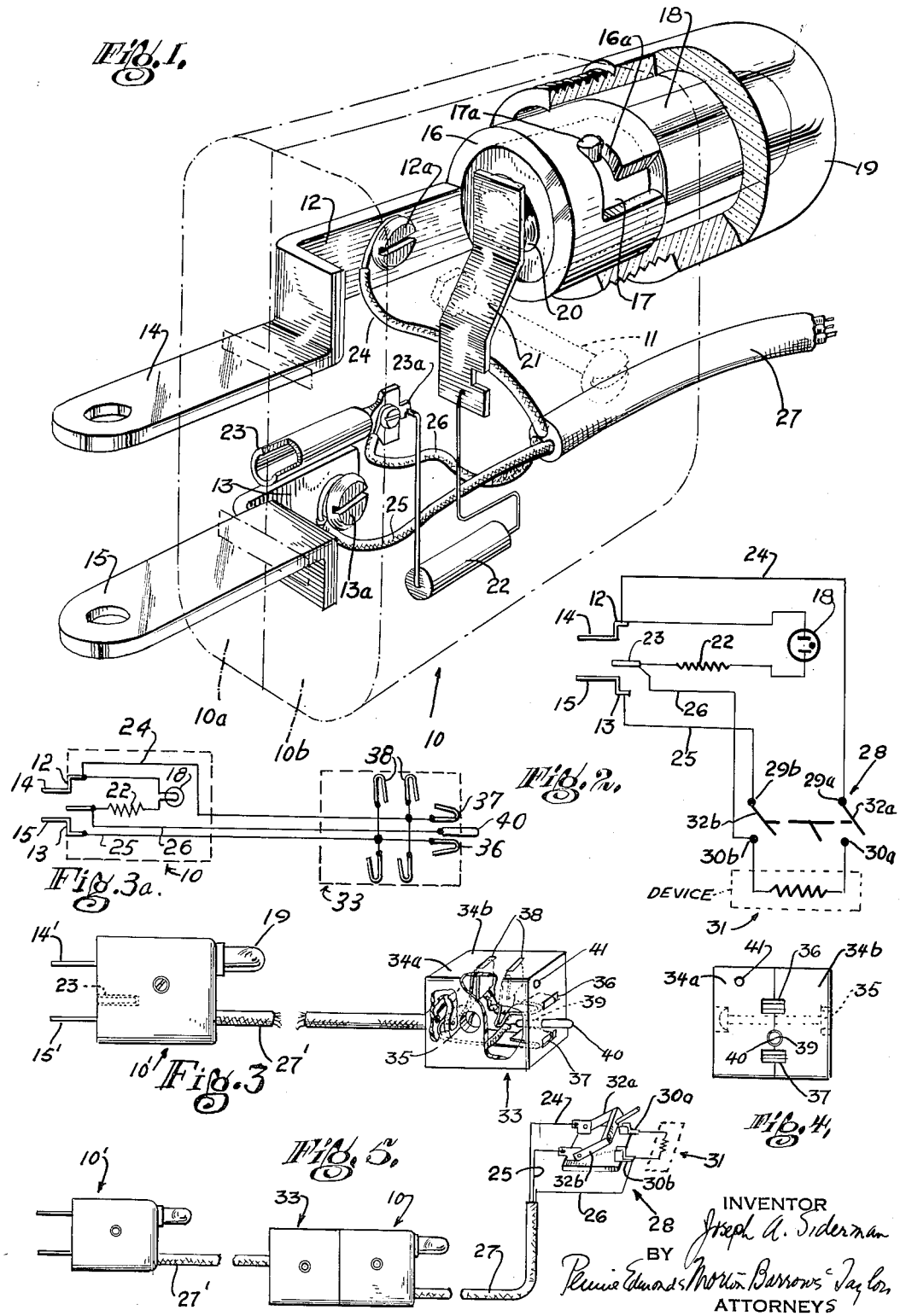

2,731,629

WIRING ASSEMBLY WITH INDICATOR MEANS

Joseph A. Siderman, Red Bank, N. J.

Application January 6, 1955, Serial No. 480,106

11 Claims. (Cl. 340—252)

This invention relates to electrical wiring systems and is concerned more particularly with a novel assembly which can be used with such a system for connecting a source of current to a load device and provides a signal at a point remote from the device, whenever current is flowing to the device. The assembly may be employed in the same manner as a standard two-wire plug and cord set, so that it does not require changes in either the wiring system or the device, and it affords especial advantages, when used for making a connection between an outlet and a device, the operational condition of which cannot be determined by observation from the location of the outlet.

In various electrical installations, it is common to supply power from a group of outlets at one location to a number of devices at varying distances from the outlets and, when continuous operation of the devices is not necessary, it is possible by changing the connections between the outlets of the devices as required to utilize a given number of outlets for supplying a larger number of devices. The breaking of a live connection between an outlet and a device is undesirable for obvious reasons, unless the device is to be intentionally put out of operation. Accordingly, when a connection is to be changed in a system of the type referred to, the connections not in actual use for supplying power to devices must first be ascertained. When the devices are scattered and, because of their distance from the outlets or for other reasons, it is impossible to determine from the outlets which of the devices is receiving current, it is necessary for the person desiring to make a new connection to inspect the devices one after another until he finds one not in use and he may then disconnect the idle device and employ the outlet, to which it was connected. When the devices are at considerable distances from the outlets, the disadvantages of having to visit one or more of the devices before such a change in the connections can be made will be apparent. Also, in some circumstances, as, for example, when a device is being employed in a photographic dark room, it may be impossible to determine the operational condition of the device without causing damage to work in process.

The present invention is directed to the provision of an assembly for use with an electrical system of the type above described, which can be employed as a connection between an outlet and a load device and provides a signal at the outlet or other selected spot showing that the device is receiving current. In its simplest form, the assembly includes a cap of novel construction which is provided with terminals connectable to the outlet and an indicating lamp, a switch for controlling the operation of the device and ordinarily located on the device, and a cable connecting the cap and the switch in such a manner that, when the switch is closed to permit the flow of current to the device, the lamp lights up. For special purposes, the assembly may include an extension comprising a receptacle having terminals connected to those of the indicator cap, the receptacle being constructed to cooperate with a second indicator cap, so that the condition of the load device may be indicated both at the outlet and at the receptacle, which may be at a point between the outlet and the device and remote from both.

For a better understanding of the invention, reference may be made to the accompanying drawing in which:

Fig. 1 is a view in perspective of one form of indicator cap for use in the new assembly with the housing of the cap shown diagrammatically;

Fig. 2 is a wiring diagram illustrating the use of the assembly;

Fig. 3 is a view in elevation of an extension used in the modified form of the assembly shown in Fig. 5;

Fig. 3a is a wiring diagram of the extension shown in Fig. 3.

Fig. 4 is a view in end elevation of the receptacle; and

Fig. 5 is a view in elevation of the modified form of the assembly.

The indicator cap 10 employed in the new assembly comprises an insulating housing, which is made of two complementary halves 10a, 10b having flat inner surfaces and held together with the surfaces in contact by a bolt 11. The two parts of the housing are formed in the usual way with inner complementary recesses for receiving the other parts of the cap and the cap shown includes terminals 12, 13 disposed in such recesses and having terminal screws 12a, 13a. The terminals are provided with respective flat prongs 14, 15, which project out through one end surface of the housing and lie parallel, so that they can be inserted into contact receiving members of an outlet receptacle.

The terminal 12 is formed at its inner end with a socket 16 of generally cylindrical form for receiving the base 17 of a lamp 18, which is preferably of the gas-filled type. The socket has a bayonet slot 16a for receiving a pin 17a on the base of the lamp and the lamp is protected by a cover 19 of suitable glass or plastic material, which is screwed into an internally threaded recess in the housing, in which socket 16 lies. When the lamp is in place in the socket, the central terminal 20 at the end of its base engages a spring terminal member 21 mounted in the housing. The terminal member 21 is connected through a high resistance 22 to an ear 23a on a tubular terminal 23 disposed within a recess in housing 10. The terminal 23 lies between and in asymmetric relation to the prongs 14, 15 and the outer end of terminal 23 lies flush with the wall, through which the prongs project. The terminal 23 has a terminal screw 23b and the terminal screws 12a, 13a, and 23b are connected, respectively, to conductors 24, 25, and 26 of a three conductor cable 27, which extends out through an opening in the housing.

The assembly includes a switch 28, which may be of the standard two-pole type and have terminals 29a, 29b, to which the conductors 24 and 25 of the cable are respectively connected. The switch has a second pair of terminals 30a, 30b adapted to be connected to the terminals of the load device indicated at 31 and also has blades 32a, 32b connected, respectively, to terminals 29a, 29b and movable into engagement with terminals 30a and 30b to establish a connection between prongs 14, 15 and the load device. The third wire 26 of the conductor is connected to one of the terminals on the controlled side of the switch, that is, to terminal 30b.

When the assembly illustrated in Fig. 2 is to be used with a wiring system to supply current to a device, the terminals 30a, 30b of switch 28 are connected to the device and the prongs 14, 15 of the cap are inserted into the contact receiving members of the outlet. When the switch 28 is closed, terminals 12, 13 are connected by wires 24, 25 to the load device through switch 28 and the device receives power. At the same time, a circuit is established through terminal 12, lamp 18, resistance 22, terminal 23, and conductor 26 to the terminal 30b, which is connected through blade 32b, terminal 29b, and conductor 25 to terminal 13, so that current flows through the lamp and lights it. As the lamp stays lighted only so long as switch 28 is closed, the lamp provides a continuous indication at the outlet of the operational condition of the device, to which the new assembly is connected.

A modified form of the new assembly, which may be employed when it is desired to provide indications of the operational condition of a load device at two different points remote therefrom, is illustrated in Fig. 5. This assembly includes a cap 10 having its terminals connected by conductors in a three-wire cable 27 to the terminals of a switch 28, as above described, and an extension, which includes a cap 10' of the construction shown in Fig. 1, a three-conductor cable 27', and a receptacle 33. As shown in Fig. 3, the receptacle includes an insulating housing formed of complementary halves 34a, 34b held together by a screw 35 and having complementary recesses, in which contact receiving members 36, 37 are mounted. The members 36, 37 are accessible through openings in one end wall of the receptacle and are so formed and disposed that the prongs 14, 15 of an indicator cap may be inserted into them. If desired, the receptacle may have other contact receiving members connected to members 36, 37 and accessible through openings 38 in a side wall of the housing. The receptacle is provided with a socket terminal 39 similar to terminal 23 and lying between the contact receiving members 36, 37 in the same asymmetric relation thereto that terminal 23 bears to the prongs 14, 15 of a cap 10. The receptacle is also provided with a pin 40, which may be mounted in terminal 39 to extend beyond the end wall of the receptacle body or stored within a recess 41 in the receptacle housing.

The terminals within the cap 10', from which the prongs 14', 15' extend, are connected by conductors in the three-wire cable 27' to the contact receiving members 36, 37 in the receptacle. The terminal 23' of the cap is connected by the third conductor of the cable to the terminal 39 of the receptacle.

In the use of the modified assembly including the extension, the prongs 14', 15' of the cap 10' of the extension are inserted into the contact receiving members of the outlet and the prongs 14, 15 of the cap 10 are inserted into the contact receiving members 36, 37 of the receptacle. The pin 40 projecting from the end face of the receptacle enters the socket terminal of the second cap and, since the pin is asymmetrically disposed in relation to the contact receiving members of the receptacle, it acts as a polarizing means to insure that the prongs of the cap 10 will be inserted in the proper contact receiving members of the receptacle. When the assembly has been completed as described, the closing of the switch causes current to be supplied to the device. At the same time, circuits are established from the prong 14' of cap 10' at the outlet through the two lamps and the third wire of the cables to a live contact on the controlled side of the switch. The two lamps are thus lighted up and indicate at both the receptacle and the outlet that the device is receiving current. The contact receiving members 38 of the receptacle may be employed to supply current to a device, as to which no indication of condition is desired.

The receptacle described includes a polarizing pin 40, which may be stored in recess 41, when it is desired to employ the receptacle for making a connection by means of an ordinary two-prong plug. Instead of providing a removable pin and a storage receptacle, the polarizing terminal may be a spring-pressed pin, which can be pushed back into its recess, when the receptacle is to be used with a standard plug. When the cap of the extension shown is inserted in an outlet, the spring-pressed pin exposed beyond the end of the receptacle becomes live, but it does not constitute a source of shock, since the lamp and the resistor 22 permit only a minute current to pass. The removable pin, which may be stored in the recess, is, however, preferred.

I claim:

1. An electrical wiring assembly, which comprises an insulating housing, a pair of main terminals within the housing, an auxiliary terminal within the housing, a connection between one main terminal and the auxiliary terminal including an indicating device and a resistance in series therewith, a three conductor cable having its conductors connected at one end within the housing to the main and auxiliary terminals, respectively, and a switch having a pair of terminals connected to the other ends of the conductors leading from the main terminals within the housing, a second pair of terminals adapted to be connected to a load, and blades attached to the terminals of the first pair and operable to connect them to respective terminals of the second pair, the third conductor of the cable connecting the auxiliary terminal to one of the second pair of switch terminals.

2. In an electrical wiring assembly, the combination of a cap including an insulating housing, a pair of pronged terminals mounted in the housing and projecting through a wall thereof, an auxiliary terminal socket mounted within the housing and open through said wall in asymmetric relation to the pronged terminals, and a connection between one pronged terminal and the auxiliary terminal including an indicating device and a resistance in series therewith, a receptacle having an insulating body, a pair of contact engaging members within the body and accessible through a wall thereof, and an auxiliary terminal projecting beyond said wall in asymmetric relation to the contact engaging members, the members and auxiliary terminals of the receptacle being capable of mating with the pronged terminals and socket of a cap, and a three conductor cable having its conductors connecting the pronged terminals and terminal socket of the cap to the contact engaging members and auxiliary terminal, respectively, of the receptacle.

3. A cap for use in an electrical wiring system, which comprises an insulating housing, a pair of main terminals within the housing, an auxiliary terminal within the housing, a connection between one main terminal and the auxiliary terminal including an indicating device and a resistance in series therewith, and a three conductor cable having its conductors connected within the housing to the main and auxiliary terminals, respectively, the cable extending out of the housing.

4. The cap of claim 3, in which the main terminals have prongs projecting out of the housing.

5. The cap of claim 3, in which the connection includes a socket accessible from outside the housing and the indicating device is a lamp mounted in the socket, and the housing is provided with a cover for the lamp.

6. The cap of claim 3, in which the auxiliary terminal is a socket open through a wall of the housing.

7. The cap of claim 3, in which the main terminals are parallel prongs projecting out of the housing and the auxiliary terminal is a socket open through a wall of the housing and asymmetrically disposed relatively to the prongs.

8. A cap for use in an electrical wiring system, which comprises an insulating housing, a pair of main terminals within the housing, an auxiliary terminal within the housing, and a connection between one main terminal and the auxiliary terminal including a socket, a spring terminal member at one end of the socket, a resistance connected to the spring terminal member and to the auxiliary terminal, and a lamp mounted in the socket and engaging the spring terminal member, said lamp being visible from outside the housing.

9. The cap of claim 8 in which the main terminals have prongs extending out of the housing, and the socket is integral with one of the main terminals.

10. An electrical wiring assembly which comprises an insulating housing, a pair of terminals within the housing, a three-conductor cable extending from the housing, two of the conductors of said cable being connected, respectively, to said terminals, a connection between one end of the third conductor of said cable and one of said terminals including an indicating device, and a switch having a pair of terminals connected to the other ends of the conductors leading from said terminals within the housing, a second pair of terminals adapted to be connected to a load and switching means attached to the terminals of the first pair and operable to connect them to respective terminals of the second pair, the other end of the third conductor of the cable being connected to one of said second pair of switch terminals.

11. A cap for use in an electrical wiring system which comprises an insulating housing, a pair of terminals within the housing, a three-conductor cable extending from the housing, two of the conductors of said cable being connected, respectively, to said terminals, and a connection between one end of the third conductor of said cable and one of said terminals including an indicating device.

References Cited in the file of this patent

UNITED STATES PATENTS

| | | |
|---|---|---|
| 1,078,172 | Smith | Nov. 11, 1913 |
| 2,112,137 | Brach | Mar. 22, 1938 |
| 2,696,607 | Witkin | Dec. 7, 1954 |

OTHER REFERENCES

Article on page 245 of the October 1945 issue of Scientific American titled "Safety Plug."